No. 877,748. PATENTED JAN. 28, 1908.
H. H. URQUHART.
BRAKE SHOE FOR LOCOMOTIVES.
APPLICATION FILED SEPT. 9, 1907.
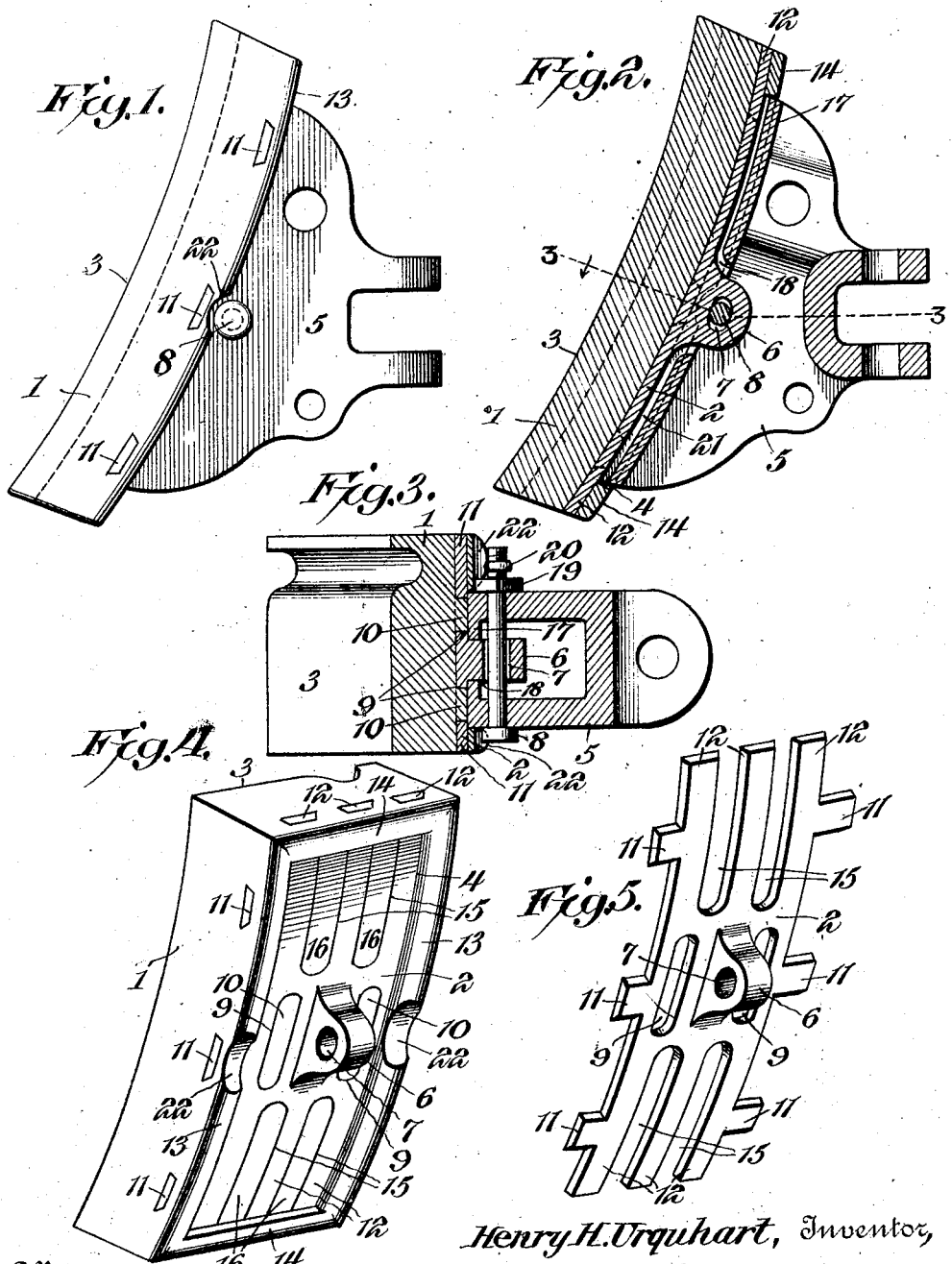
Henry H. Urquhart, Inventor,
Witnesses
Howard D. Orr.
J. F. Riley
By E. G. Siggers
Attorney

UNITED STATES PATENT OFFICE.

HENRY H. URQUHART, OF PADUCAH, KENTUCKY, ASSIGNOR TO URQUHART BRAKE SHOE & BRAKE HEAD COMPANY, OF PADUCAH, KENTUCKY, A CORPORATION OF KENTUCKY.

BRAKE-SHOE FOR LOCOMOTIVES.

No. 877,748.   Specification of Letters Patent.   Patented Jan. 28, 1908.

Application filed September 9, 1907. Serial No. 391,968.

*To all whom it may concern:*

Be it known that I, HENRY H. URQUHART, a citizen of the United States, residing at Paducah, in the county of McCracken and State of Kentucky, have invented a new and useful Brake-Shoe for Locomotives, of which the following is a specification.

The invention relates to improvements in brake shoes for locomotives.
The object of the present invention is to improve the construction of brake shoes for locomotives, and to provide a simple and comparatively inexpensive brake shoe of increased efficiency and greater strength and durability.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a side elevation of a brake shoe, constructed in accordance with this invention. Fig. 2 is a central vertical sectional view of the same. Fig. 3 is a transverse sectional view on the line 3—3 of Fig. 2. Fig. 4 is a detail perspective view of the brake shoe. Fig. 5 is a similar view of the reinforcing steel frame.
Like numerals of reference designate corresponding parts in all the figures of the drawing.

The brake shoe consists of a body 1 of gray iron, or other suitable material and a reinforcing frame 2 of steel, embedded in the body 1 by molding the latter around the former. The brake shoe, which is provided with a wheel engaging face 3 of the usual configuration, has a recess or depression 4 at the back for the reception of a brake head 5.

The reinforcing steel frame, which preferably consists of a drop steel forging, is located within the recess or depression and constitutes the major portion of the rear face of the brake shoe, and it is provided with a centrally arranged steel lug 6. The steel lug 6 is provided with a transverse opening 7, through which passes a transverse bolt 8 for securing the brake shoe to the brake head.

The brake shoe is curved longitudinally and the reinforcing frame is curved to conform to the curvature of the former, and the said frame is provided at opposite sides of the lug 6 with longitudinal openings 9, which receive portions 10 of metal of the body of the brake shoe, whereby the reinforcing frame is more securely united at the central portion with the body of the brake shoe to effect a more rigid connection between the steel lug and the body of the brake shoe. The sides and ends of the frame are interlocked with the body of the brake shoe by means of side and end arms 11 and 12, which extend through the marginal side and end walls 13 and 14 of the recess or depression 4. The side and end arms are oppositely beveled to provide a dove-tail joint or connection, and the said side arms are located at the center and at points between the center and ends of the frame, as clearly illustrated in Fig. 5 of the drawing. The end arms are also located at the center and side portions of the ends of the frame, the end arms being spaced apart by longitudinal slots 15, which receive portions 16 of metal of the body of the brake shoe. The outer face of the reinforcing steel frame is flush with the portions 10 and 16 of the body.

The brake head is hollow, and it is provided in its front connecting portion or wall 17 with an opening 18, through which the lug 6 passes, and the side walls of the brake head are pierced by the transverse bolt 8. The transverse bolt 8 is provided at one end with a head, and it is threaded at the other end to receive a nut 19, and it has a perforation for the reception of the key 20. The connecting wall or face 17 is also provided with a central longitudinal groove 21, which affords the necesary clearance in placing the brake shoe on and in removing it from the brake head. The side walls of the depression or recess of the body are provided with notches 22 to enable the head of the bolt and the nut to clear the brake shoe.

The brake shoe is adapted for use at either the right or left hand side of a locomotive, so that the brake shoes thereof are interchangeable. The steel frame imparts to the brake shoe the strength of a solid steel shoe in the connection of the shoe to the brake head, and the embedding of the reinforcing steel frame in the brake shoe by molding the body around the frame provides a perfectly safe shoe, which possesses the durability and strength of a solid steel shoe.

Having thus fully described my invention, what I claim as new and desire to secure by Letters Patent, is:—

1. A brake shoe consisting of a body provided at the back with a depression or recess, and a reinforcing frame embedded in the body at the back thereof and having side and end arms extending through the walls of the depression or recess.

2. A brake shoe consisting of a body provided at the back with a depression or recess having a surrounding marginal wall at the ends and sides, and a reinforcing frame embedded in the body at the back thereof and having arms or portions extending through the marginal wall to the exterior thereof.

3. A brake shoe consisting of a body having a depression or recess, and a reinforcing frame embedded in the body at the recess and provided with side and end arms beveled at the edges and extending through the side and end walls of the recess or depression, said frame being also provided with central and end longitudinal slots or openings, which receive portions of metal of the body.

4. A brake shoe consisting of a body having a depression or recess, and a reinforcing frame embedded in the body at the recess and provided with side and end arms extending through the side and end walls of the recess or depression, said frame being also provided with slots or openings, which receive portions of metal of the body, and a lug projecting from the frame for securing the brake shoe to a brake head.

In testimony that I claim the foregoing as my own, I have hereto affixed my signature in the presence of two witnesses.

HENRY H. URQUHART.

Witnesses:
 E. C. MERCHANT,
 H. C. LEECH.